United States Patent [19]

Summa et al.

[11] Patent Number: 4,619,575
[45] Date of Patent: Oct. 28, 1986

[54] APPARATUS FOR STORAGE AND RETRIEVAL OF THIN TRAYS AND SHEETS

[75] Inventors: Gareth D. Summa, Riverside, Mo.; George K. Reed; Harold S. Burt, both of Kansas City, Kans.

[73] Assignee: Mid-West Conveyor Company, Inc., Kansas City, Kans.

[21] Appl. No.: 695,579

[22] Filed: Jan. 28, 1985

[51] Int. Cl.4 ............................................. B65G 1/06
[52] U.S. Cl. .................................... 414/280; 294/118; 414/281; 414/286; 414/661; 414/733; 414/736; 414/753
[58] Field of Search ............... 414/281, 280, 277, 267, 414/286, 659, 660, 661, 733, 736, 744 A, 753, 751; 294/118, 119, 86.4

[56] References Cited

U.S. PATENT DOCUMENTS

| | | | |
|---|---|---|---|
| 1,835,579 | 12/1931 | Westin | 414/733 |
| 2,732,085 | 1/1956 | Siempelkamp . | |
| 2,907,479 | 10/1959 | Cunningham | 414/280 X |
| 3,199,686 | 8/1965 | Wasserman | 414/751 X |
| 3,380,597 | 4/1968 | Czetli | 414/744 A |
| 3,403,793 | 10/1968 | Armington . | |
| 3,486,092 | 12/1969 | Macko . | |
| 3,561,614 | 2/1971 | Tezuka et al. | 414/751 |
| 3,731,820 | 5/1973 | Niki et al. | 414/753 |
| 3,809,259 | 5/1974 | Pipes | 414/280 |
| 3,964,577 | 6/1976 | Bengtsson | 414/280 X |
| 3,987,887 | 10/1976 | Gentili | 414/751 X |
| 4,010,855 | 3/1977 | Smith . | |
| 4,358,239 | 11/1982 | Dechantsreiter | 414/282 X |
| 4,381,169 | 4/1983 | Muhr et al. . | |
| 4,416,577 | 11/1983 | Inaba et al. | 414/736 X |
| 4,428,708 | 1/1984 | Burt . | |
| 4,482,289 | 11/1984 | Inaba et al. | 414/736 |
| 4,546,901 | 10/1985 | Buttarazzi | 414/280 X |

FOREIGN PATENT DOCUMENTS 1292581 4/1969 Fed. Rep. of Germany ...... 414/282

*Primary Examiner*—Robert J. Spar
*Assistant Examiner*—Stuart J. Millman
*Attorney, Agent, or Firm*—Litman, Day and McMahon

[57] ABSTRACT

An apparatus for selectively storing a thin tray or sheet in an elongate storage location, and retrieving trays therefrom, includes a tray extractor and a transport assembly. The tray extractor comprises a tray engagement mechanism and a tray linear movement actuator. The tray engagement mechanism operates as a hand to selectively grip or release trays which are being handled by the apparatus. The tray linear movement actuator acts as an arm to position the tray engagement mechanism and, when operated, to move an engaged tray. The tray linear movement actuator comprises a linear movement link and pulley arrangement which moves an engaged tray along a linear path of motion, and which maintains the tray engagement mechanism in a selected orientation with respect to that path of movement. The tray engagement mechanism comprises an X-shaped scissors mechanism having a plurality of jaws thereon. Scissors motion of the mechanism opens and closes the pairs of jaw members to selectively engage or disengage a tray. In the preferred embodiment, the trays comprise rectangular sheets of corrugated material having alternating troughs and rises extending generally parallel to the longer sides, and the jaws comprise cylindrical members which fit into the troughs or rises to securely engage the tray.

15 Claims, 15 Drawing Figures

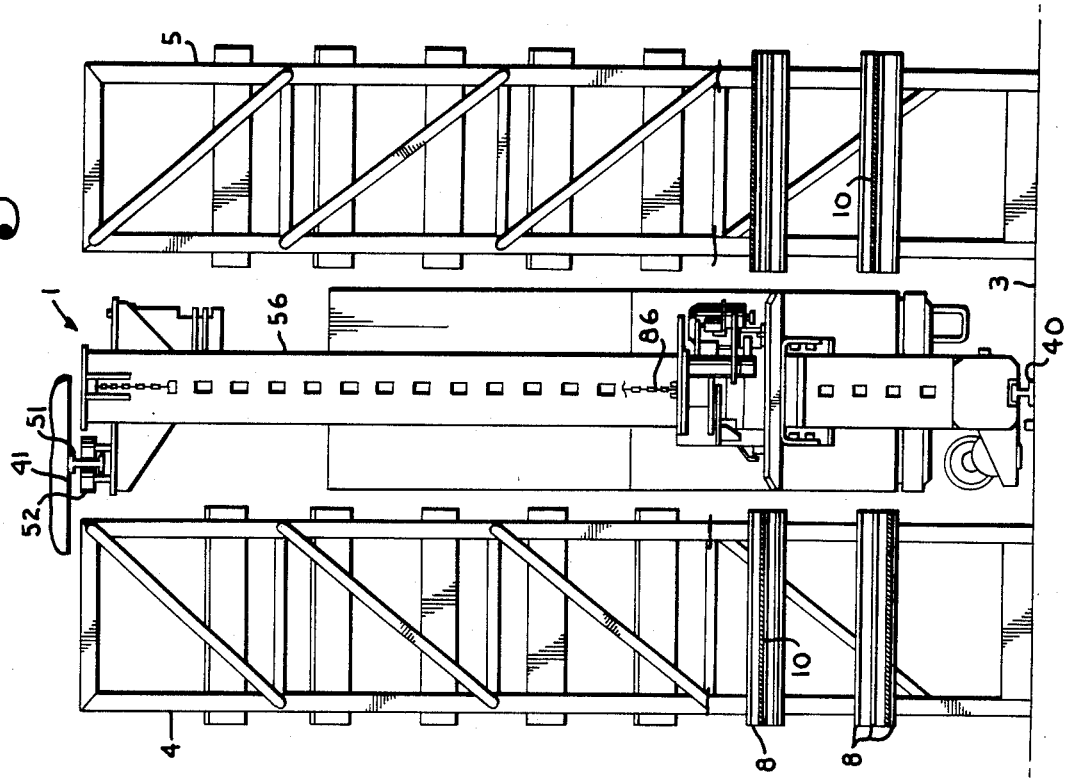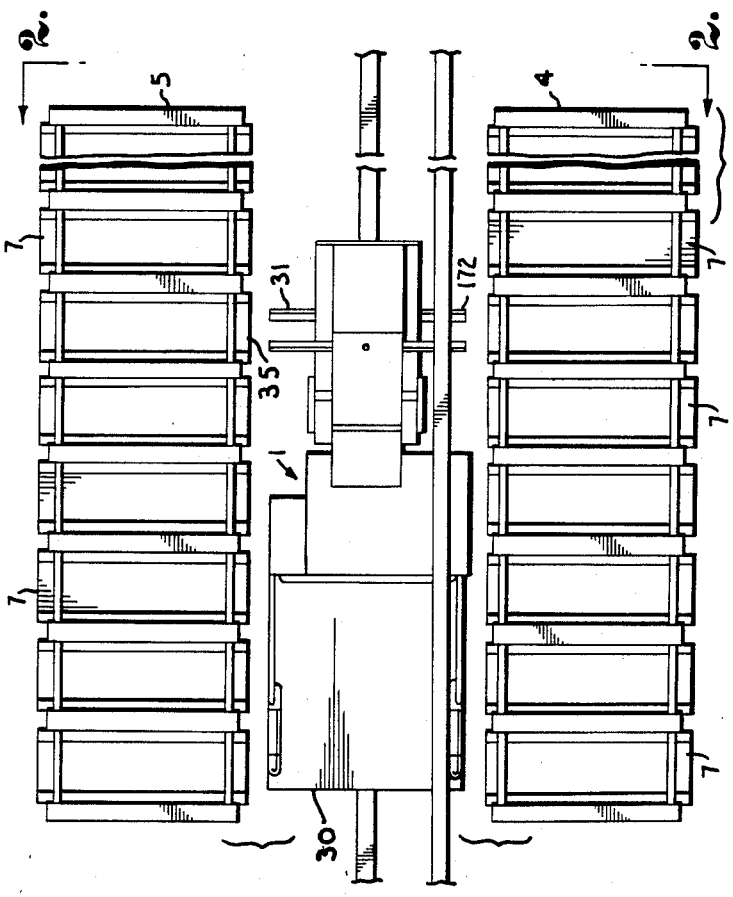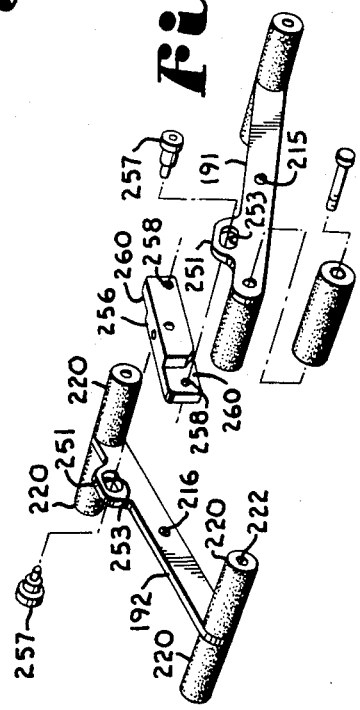

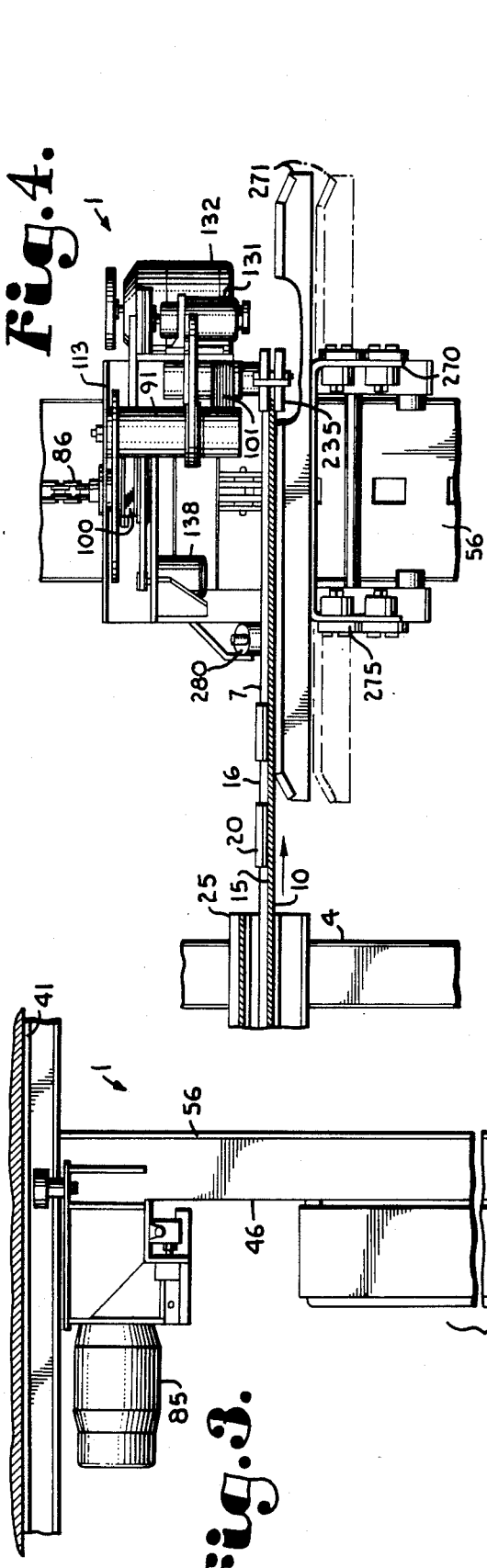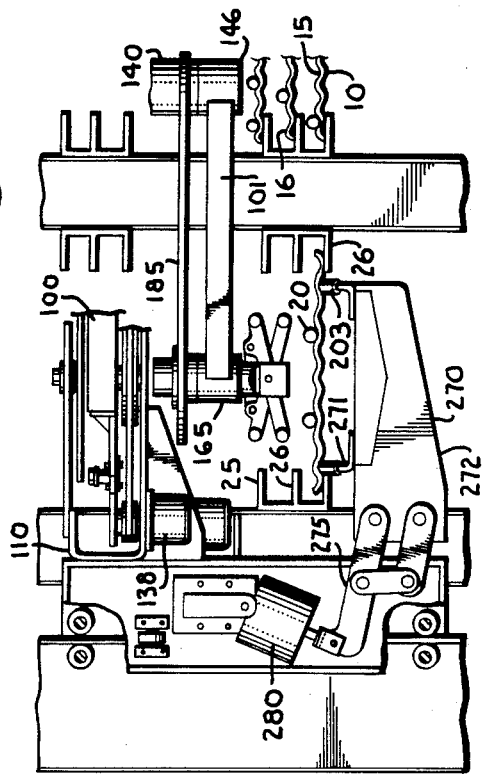

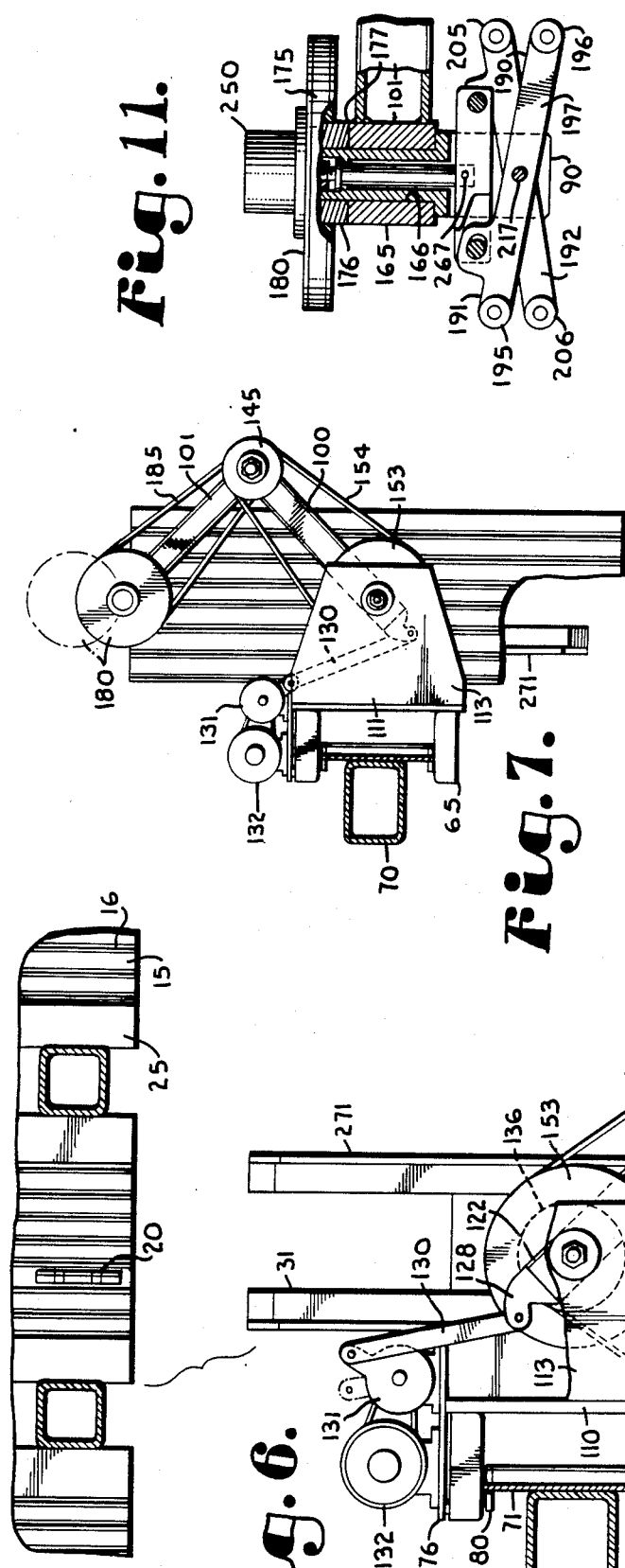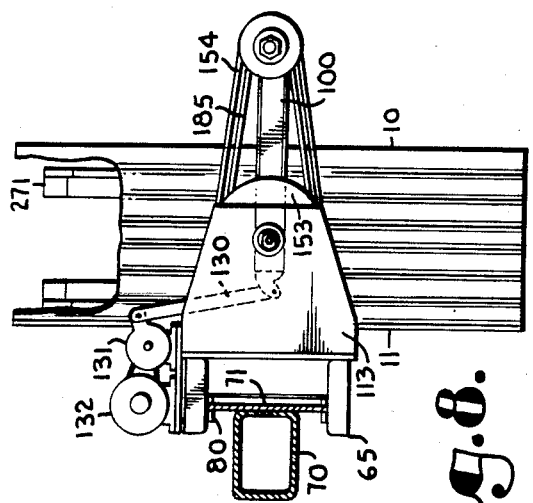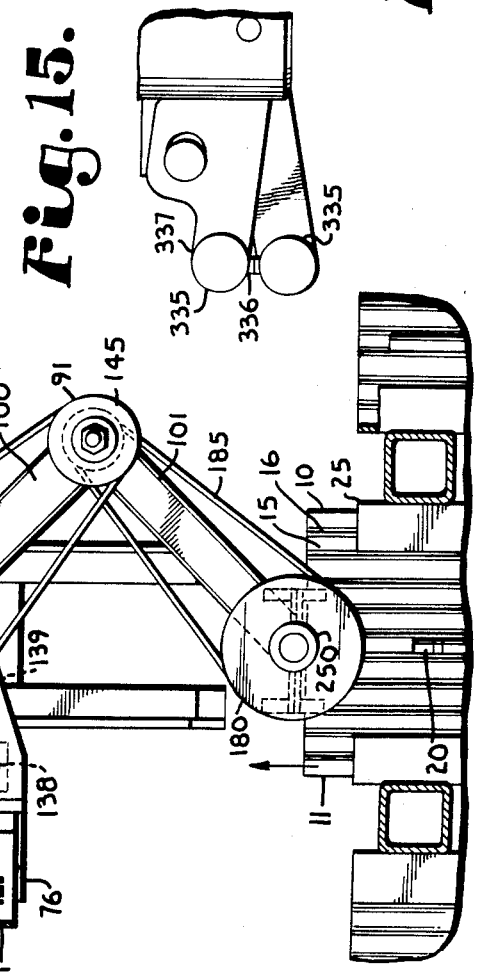

APPARATUS FOR STORAGE AND RETRIEVAL OF THIN TRAYS AND SHEETS

BACKGROUND OF THE INVENTION

The present invention relates to conveyors and automatic warehousing systems, and in particular to apparatus for the storage and retrieval of objects in warehouses. Specifically, the invention relates to apparatus for the storage and retrieval of relatively thin trays or sheets having cylindrical nuclear materials resting thereon.

A typical warehouse includes numerous storage bins or locations in which objects are stored until needed. Each storage bin has a specific address, that is a set of coordinates by which it can be identified and distinguished from other storage locations. In most instances rows of racks are positioned on either side of an aisle. The racks include a plurality of storage locations identified by their vertical height and horizontal position along the aisle.

In an automated warehouse system, a truck or cart having an object handler mounted thereon moves up and down the aisle, selectively retrieving an object from one of the storage locations, or selectively storing an object therein.

In a typical warehouse, the object to be stored is a large package or the like. Often, in such systems, the package is stored upon pallet-like extensions in the storage bin. The package may then be readily accessed from underneath and lifted from the pallets and removed from the storage bin. Object engagement mechanisms which accomplish this are generally fork or tongue extensions which extend from the cart to a position underneath the package, and which are then lifted to engage the package, in a manner somewhat analogous to a fork lift lifting an object from the surface of a pallet. With such devices, the package is held upon the object engagement mechanism solely by gravity. Extension or retraction of the tongue moves the package into or out of the storage bin. When the package is supported outwardly of the storage bin, motion of the truck or cart moves the package about the warehouse.

A major problem with such conventional systems is that the object to be stored is not positively engaged by the object handler mounted on the cart. Rather, the package is merely held on the object handler by means of gravity and friction. Thus, it can be relatively easily jostled off of the cart during transportation.

In some industries, the object to be stored or transported is a relatively shallow tray or a thin sheet of material. In some instances, it may be desired to simply store the tray or sheet itself; in others, small objects may rest inside the tray or on top of the sheet and it is the small objects themselves which are of concern. Conventional warehousing systems have not been completely successful in handling the storage of such items.

In particular, in the nuclear industry, relatively small elongate cylinders of nuclear material are often handled and stored. It may be important to maintain the cylinders at a selected distance separated from one another, even when more than one cylinder rests on a single thin tray or sheet. The cylinders may be relatively securely supported by a corrugated tray, with the cylinders resting in depressions caused by the corrugations. In this manner, they will not roll about the tray and come into contact with one another. However, automatic warehousing systems having object handlers specifically developed for secure handling of such corrugated trays have heretofore not been available.

In industries such as the nuclear industry it is generally important that the thin tray or sheet be securely held by the object handler, so that risk of accident is somewhat minimized. Previous types of object handlers have not been completely successful in obtaining this result.

In some industries it may be important that the object handler be capable of accessing the thin sheet from either end. For example, the thin tray may be removed from the right side of an aisle, transported by the cart, and stored on the left side of the aisle. This generally requires that the object handler be capable of positively engaging the thin sheet on either of its ends.

A possible advantage to the storing of small objects on relatively shallow trays or thin sheets is that they may be stored with the sheets in relatively close vertical proximity to one another. That is, the vertical distance between each tray can be relatively small. However, conventional object handlers in warehousing systems have generally required substantial vertical space for their operation, making it more difficult to fully realize the space conserving advantage to the utilization of shallow trays or thin sheets for the storage of objects.

In a large warehouse having numerous storage bins, a great many trays or sheets might be necessary for efficient operation. It would be preferable that the sheets not have special attachments or extensions thereon, so that they may be relatively inexpensively made. Further, such special attachments or extensions might become caught on the rack, or portions of the handler, increasing the possibility of accidents. Conventional methods of handling trays generally require extensions on the trays which are engaged by a portion of the handler. It is readily seen that the avoidance of such special attachments or extensions is preferred.

The problems outlined above, and various other problems discussed below, were not satisfactorily resolved until the emergence of the instant invention.

OBJECTS OF THE INVENTION

Therefore, the objects of the present invention are: to provide an apparatus for storage and retrieval of relatively shallow trays or thin sheets in a warehouse; to provide such an apparatus which positively engages the sheets during storage and retrieval; to provide such an apparatus in which the sheet may be a corrugated tray having a series of alternating troughs and rises; to provide such an assembly in which special attachments or extensions on the trays or sheets are not required; to provide such an assembly which operates to store and retrieve trays or sheets positioned in a close vertical proximity to one another; to provide such an assembly specifically adapted for the handling of trays having cylinders of nuclear material resting thereon; to provide such an assembly which includes a transporter cart and an object handler; to provide such an assembly in which the transporter cart is adapted to move along an aisle in a warehouse having storage locations on opposite sides thereof; to provide such an assembly in which the object handler can engage a tray on either side of the transporter cart or aisle and load the tray onto the cart; to provide such an assembly in which a tray loaded upon the cart may be engaged by the object handler and stored on either side of the aisle, as selected; to provide such an assembly in which the object handler comprises a linear movement actuator and a tray engagement mechanism; to provide such an assembly in which the tray engagement mechanism selectively grips or releases the selected tray; to provide such an assembly in which the linear movement actuator selectively positions the tray engagement mechanism for engagement with a tray located in a storage bin on either side of the aisle or positioned on the transporter cart; to provide such an assembly in which the linear movement actuator selectively operates to move an engaged tray along a linear path of motion generally at right angles to the aisle; to provide such an assembly in which the tray engagement mechanism comprises a pair of simultaneously actuated opposing jaw members; to provide such an assembly in which the jaw members are actuated by an X-shaped scissors mechanism; to provide such an assembly in which the linear movement actuator comprises a linear motion link and pulley arrangement including first and second links, which cooperate to move an end of one of the links along a linear path; and to provide such an assembly which is relatively inexpensive to produce, easy to manufacture and assemble, relatively simple to use, and which is particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

An apparatus is provided for storage and retrieval of relatively shallow trays or thin sheets in a warehouse system. A warehouse generally comprises rows of storage racks positioned on opposite sides of an aisle, or a plurality of aisles. The shallow trays and thin sheets slide into and out of storage bins, or storage locations, which face the aisle. Movement of the thin trays or sheets as they are inserted or removed from the storage locations will be generally perpendicular to a longitudinal axis of the aisle. While in the storage locations, the thin trays are supported by pallets which extend underneath opposite sides of the tray. The thin trays may be stored in relatively close vertical proximity to each other.

The apparatus according to the invention moves up and down the aisle, as selected, to locate a selected tray and remove it from the storage rack, or to place a selected tray into a selected position in the storage rack. The apparatus may, accordingly, be utilized to retrieve objects from the warehouse or to store objects therein.

The apparatus includes two general components, a transport assembly and a tray extractor. The transport assembly generally comprises a cart upon which the tray extractor is mounted. The cart may be selectively movable along the aisle to desired locations where the tray extractor is to be operated. It will be readily understood, from the below detailed description, that numerous types of transport assemblies can be utilized in conjunction with the present invention.

The tray extractor includes a tray engagement mechanism and a tray linear-movement actuator. The tray engagement mechanism includes pairs of simultaneously actuated opposing jaw members, which are selectively actuated to bite or grip an end of a selected tray or sheet. To ensure simultaneous actuation of the pairs of jaw members, the jaw members are mounted upon an X-shaped scissors linkage, which is selectively actuated by movement of a piston associated with both cross-members of the linkage.

The linear movement actuator moves the tray engagement mechanism into selected positions for operation to engage a tray, release a tray, or move a tray into or out of a storage location. Generally, the linear movement actuator moves the tray engagement mechanism along a path of motion which is generally perpendicular to the longitudinal axis of the aisle. In the preferred embodiment, the linear movement actuator comprises a linear motion link and pulley arrangement including first and second links, with the tray engagement mechanism being mounted on an end of the second link. The links cooperate in motion so that the end of the second link, upon which the tray engagement mechanism is mounted, only moves along a selected linear path. Further, the pulley arrangement ensures that the tray engagement mechanism is maintained in a selected orientation with respect to the storage bins. That is, it is maintained in an orientation permitting engagement with stored or transported trays. Further, the linear movement actuator allows trays on either side of the aisle to be engaged, and it may be operated to engage a tray being carried by the transporter on either end thereof. In the preferred embodiment, the X-shaped scissors linkage has four pairs of simultaneously actuated opposing jaw members mounted thereon, with two pairs being located on each side of the X-shaped scissors linkage. With this structure, the tray engagement mechanism has two sides, which are generally mirror images of each other, and with which a tray may be engaged by either side of the tray engagement mechanism.

In the preferred embodiment, the apparatus includes a tray support mechanism. The tray support mechanism is preferably a pair of pallets mounted upon the transport assembly. When a tray is being transported by the transport assembly, it rests upon the tray support mechanism.

From the following description, operation of the apparatus will be generally understood. The sequence described involves removal of a tray from the storage location, transport of the tray to another location, and storage of the tray thereat. It will be understood that the assembly may be used in other sequences of operation, as for example to store a tray which has not been previously stored, or to remove a tray to a remote location for use.

In the instant example, the thin tray or sheet to be stored comprises a generally rectangular shaped corrugated tray having a plurality of alternating troughs and rises. The troughs and rises generally extend parallel to the longer dimension of the rectangular sheet. The rectangular sheet has two sides, corresponding to the longer edges of the rectangular shape, and two ends, corresponding to the shorter edges. A tray is stored within a storage location with one of the ends being generally flush to an opening in the storage location adjacent to the aisle and with the tray being positioned generally horizontally. The tray is supported within the storage location by pallets which extend along and underneath each side edge of the tray. Thus, a tray may be readily slid into or out of the storage location. It will be understood that most of the tray, and in particular the central portion, is not in contact with the storage bin pallets.

Initially, the transport assembly is selectively actuated to position the apparatus at a position in the aisle corresponding to the horizontal location of the storage bin containing the tray to be retreived. The tray extractor is mounted upon a vertically adjustable portion of the transport assembly, so that it may be selectively moved for engagement with the selected tray. After the appropriate vertical adjustment is made, the tray engagement mechanism and linear movement actuator are appropriately positioned for engagement with the selected tray. Selective actuation of the linear movement actuator positions opposing jaws on the tray engagement mechanism into position for gripping of the tray. Generally, the jaws approach the corrugated tray from a direction toward an end thereof. The jaws are then actuated to grip the tray, and the linear movement actuator is selectively operated to pull the tray from the storage location. Preferably, the tray support mechanism has been positioned so that as the tray is slid out of the storage bin it is immediately slid onto the tray support mechanism, ensuring that the tray is supported substantially all of the time. The jaw of the tray engagement mechanism may then be operated to release the tray and allow it to rest upon the tray support mechanism. In the next step of the sequence, the tray support mechanism is lowered out of the way so that the tray extractor may be positioned in a non-use or transport position.

Once the tray has been removed from the storage location and is supported upon the transport assembly, the entire apparatus may be selectively moved to a desired location to which the tray is to be transported. In some instances, this may be to a location from which the tray will be removed from the warehouse. For completion of this description, however, it will be assumed that the tray is transported along the aisle to a second storage location. Generally, the horizontal location of the tray can be controlled by the transport assembly or cart. Vertical adjustment means positions the tray support mechanism and tray extractor into an appropriate vertical location for interaction with the newly selected storage bin. Generally, the vertical adjustment means positions the tray extractor so that, with linear movement only, it can slide the tray into the new storage location.

Sequentially, these final steps are as follows:

The linear movement actuator is operated to move the tray engagement mechanism out of the transport position. The tray support mechanism is lifted to place the tray at the same vertical height as pallets in the storage bin. The linear movement actuator and tray engagement mechanism are simultaneously operated to grip an end of the tray which will be adjacent the aisle when the tray is stored. The tray is then pushed by the tray extractor onto the pallets in the storage location, until the tray is completely inserted into the storage bin or storage location. The tray is then released by the tray engagement mechanism and the linear movement actuator moves the tray engagement mechanism into the non-use or transport position. The assembly is now ready for engagement with another tray, as selected.

The drawings constitute a part of this specification and include exemplary embodiments of the present invention and illustrate various objects and features thereof.

BRIEF DESCRIPTION OF THE DRAWINGS

FIG. 1 is a fragmentary, top plan view of an apparatus according to the present invention, shown in a warehouse environment.

FIG. 2 is a fragmentary, front elevational view of the apparatus and environment, taken generally along line 2—2 of FIG. 1.

FIG. 3 is an enlarged, fragmentary side elevational view of an apparatus according to the present invention, with an alternate position of a movable part indicated by phantom lines.

FIG. 4 is an enlarged, fragmentary front elevational view of a portion of the apparatus, shown being operated to remove a tray from a storage rack.

FIG. 5 is an enlarged, fragmentary side elevational view of an apparatus according to the present invention, in a warehouse environment, with portions of the apparatus broken away to show internal detail.

FIG. 6 is an enlarged, fragmentary, top plan view of the apparatus, in a warehouse environment, with portions broken away to show detail.

FIG. 7 is an enlarged, fragmentary, top plan view of a portion of the apparatus in a stage of operation, with portions broken away to show detail.

FIG. 8 is an enlarged, fragmentary, top plan view of a portion of the apparatus, shown in a stage of operation, with portions broken away to show detail.

FIG. 11 is an enlarged, fragmentary, side elevational view of a portion of the assembly, with portions broken away to show internal detail.

FIG. 14 is an enlarged, fragmentary, exploded perspective view of a portion of the apparatus.

FIG. 15 is an enlarged, fragmentary side elevational view of an alternate embodiment of a portion of an apparatus according to the present invention.

DETAILED DESCRIPTION OF THE PREFRRRED EMBODIMENT

Figure 10:
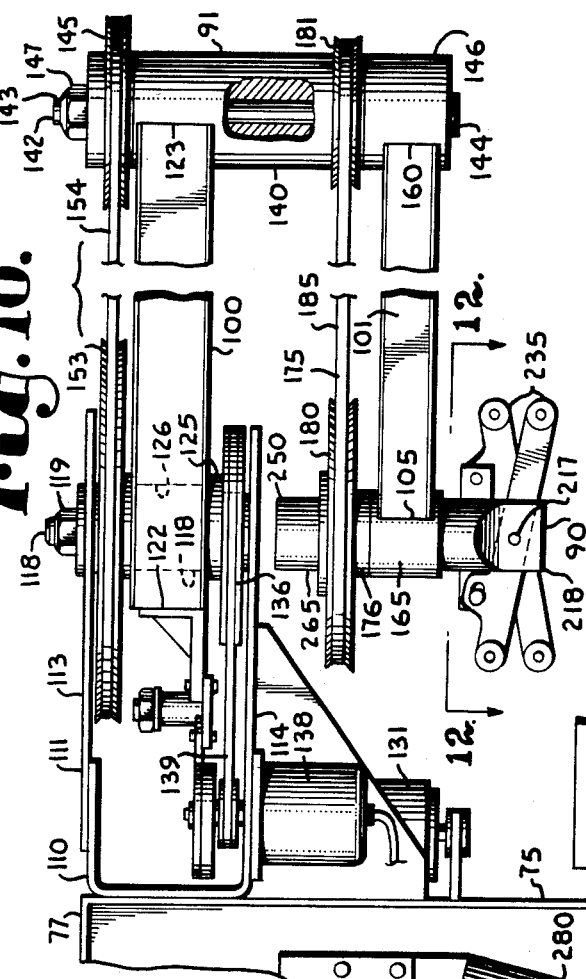
FIG. 10 is an enlarged, fragmentary side elevational view of the apparatus, with portions broken away to show detail.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1, FIG. 2, generally designates an apparatus for the storage and retrieval of thin trays or sheets, according to the present invention.

Referring to FIG. 2, the apparatus 1 is shown in a warehouse environment, where it is to be utilized. The apparatus 1 is shown positioned in an aisle 3 which extends between two rows of storage racks 4 and 5. Referring to FIG. 1, generally a top plan view of the environment, each row of racks, 4 and 5, comprises a plurality of vertical stacks 7 of storage locations 8. In the embodiment shown in FIG. 2, storage locations 8 are shown arranged in groups of three, with each stack including seven groups of storage locations 8.

Figure 9:
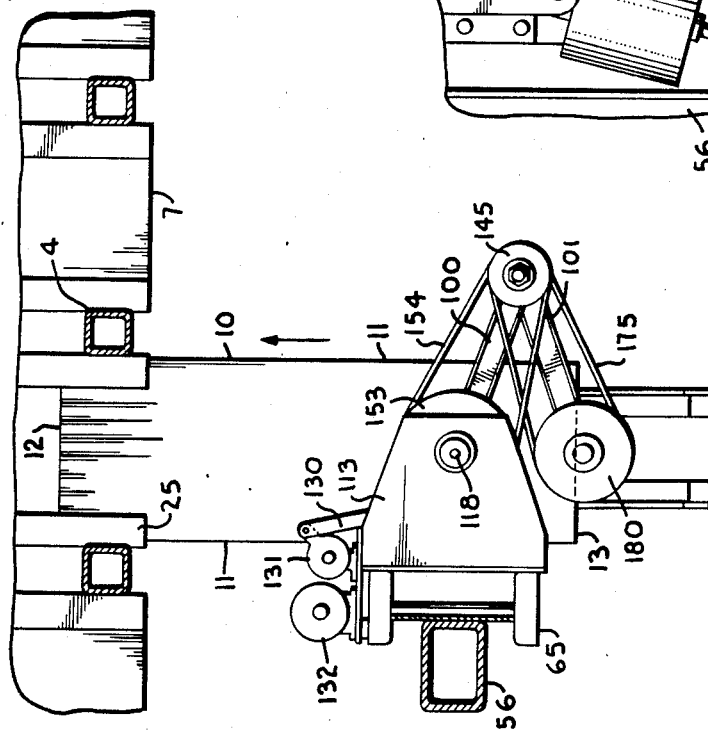
FIG. 9 is an enlarged, fragmentary, top plan view of a portion of the apparatus, shown in operation in a warehouse environment.

In the present embodiment, the objects to be stored or retrieved by the apparatus 1 are rectangular trays or sheets 10, FIGS. 6 and 9. Each sheet 10 has elongate side edges 11 and two opposite and parallel end edges 12 and 13, FIG. 9. As seen by reference to FIG. 5, in the present embodiment the trays 10, which are utilized, have a corrugated cross section with alternating troughs 15 and rises 16. The troughs 15 and rises 16 extend generally parallel to the side edges 11 of the sheets 10, FIG. 6.

For the embodiment described, FIGS. 5 and 6, the trays 10 are used to store cylindrical rods 20 of nuclear material for use in nuclear power plants. The rods 20 rest within the troughs 15 of the sheets 10, and are prevented from rolling by the rises 16. The corrugated sheets 10 are particularly useful for the storage cylindrical rods 20 of nuclear material since the sheet design not only prevents the rods 20 from rolling around on the surface of the tray 10, but it also maintains a selected distance between the rods 20 when more than one are stored on the same tray 10, FIG. 5.

The rectangular sheets 10 are stored within the storage locations 8 on top of pallet brackets 25, FIG. 5. Each storage location 8 has two pallet brackets 25 associated therewith, FIG. 5. In the present embodiment, FIG. 5, each pair of pallet brackets is capable of supporting three trays 10 at a time. Each pair of pallet brackets 25 includes a set of longitudinal side supports 26, upon which the stored sheet 10 rests. Longitudinal side supports 26, when the stored tray 10 rests thereon, support the tray 10 by extension underneath, and substantially along, both side edges 11 of the tray 10. In this manner, substantially none of the central portion, including the ends 12 and 13, of the tray 10 directly rests upon the pallet brackets 25. As will be seen from the below description, this arrangement permits the end 13 of the tray 10 which is near the aisle 3 to be engaged by the apparatus 1, FIG. 9.

Referring again to FIGS. 1 and 2, the warehouse includes rows 4 and 5 of vertical stacks 7 of storage locations 8. Many of the storage locations 8 comprise bins in which sheets 10 are stored. The sheets 10 are used to store cylindrical rods 20 of nuclear material in the storage locations 8.

It is readily seen that the tray 10 may be removed from, or inserted into, the storage locations 8 by linear movement generally perpendicular to the longitudinal aisle 3. That is, generally in directions parallel to the side edges 11 of a stored sheet 10. FIGS. 4 and 6 each show a tray 10 being partially extracted from a storage location 8 defined by a pair of pallet brackets 25. The extractions are being accomplished by operation of the apparatus 1.

Referring to FIG. 3, the apparatus 1 includes a transport assembly 30 having a tray extractor 31 mounted thereon. The transport assembly 30 moves the tray extractor 31 up and down the aisle 3, to position it for engagement with selected trays 10. The tray extractor 31 is selectively actuated to store sheets 10 in selected storage location 8, or to remove a stored tray 10 therefrom. In FIG. 1 the apparatus 1 is shown with the transport assembly 30 having positioned the tray extractor 31 in position to engage a tray 10 stored in stack 35. It will be understood that numerous trays may be stored in stack 35, each having a different vertical location. From the below description it will become clear how the assembly 1 accommodates different vertical positions of the trays 10.

Referring to FIG. 2, the transport assembly 30 rides between a floor rail 40 and a ceiling rail 41 as it moves up and down the aisle 3. Referring to FIG. 3, the transport assembly 30 includes a lower, floor rail engaging portion 45 and a vertical extension 46 which extends upwardly between the floor rail 40 and the ceiling rail 41. A variety of mechanisms may be utilized to engage the transport assembly 30 with the rails 40 and 41. In the present embodiment, the floor rail engaging portion 45 of the transport assembly 30 engages the rail 40 by means of a floor-aisle positioning mechanism or wheels, such as wheel 50, FIG. 3. The ceiling rail 41, FIG. 2, is a generally I-shaped beam 51 which is engaged by rollers 52 mounted near a top end 53 of the vertical extension 46. The vertical extension 46 includes a vertical track 56 on which the tray extractor 31 is slidably mounted, so that it may be adjusted to a selected vertical position.

Movement of the transport assembly 30 along the rails 40 and 41 is selectively actuated by transport means including a motor 60, FIG. 3. A variety of motors 60 may be utilized with the present invention. A brake mechanism (not shown) associated with the motor 60 aids in selective movement of the transport assembly 30. Thus, the transport assembly 30 provides a cart 61 which may be selectively actuated to position the tray extractor 31 as desired, in the aisle 3.

Referring to FIGS. 3 and 10, the tray extractor 31 is mounted upon a vertical positioning mechanism including a carriage 65. The carriage 65 is part of a vertical positioning mechanism 66 which may be operated to adjust the vertical position of the tray extractor 31 with respect to the aisle floor 3. For example, in FIG. 3, an alternate vertical position of the tray extractor 31 is shown in phantom lines. The carriage 65 is slidably mounted upon the vertical track 56 and the vertical positioning mechanism 66 includes means permitting vertical adjustment. A variety of vertical tracks 56 and carriages 65 may be utilized in accordance with the present invention. In the embodiment described, FIG. 6, the vertical extension 46 comprises a vertically extending box beam 70 supporting an elongate vertical track 71. The vertical track 71 is a long strip of metal mounted on the beam 70 as by welding. The vertical extension 46 then has a generally T-shaped cross section.

Referring to FIGS. 6 and 10, the carriage 65 includes a front wall 75, side walls 76, an upper wall 77 and a lower wall 78. The tray extractor 31 is mounted upon the front wall 75 of the carriage 65.

In the instant embodiment, the carriage 65, FIG. 6, is mounted upon the vertical track 71 by rollers 80 and roller brackets 81. The roller brackets 81 securely maintain the rollers 80 in the selected position. The rollers 80 slidably attach the carriage 65 to the vertical track 71 in a manner allowing the carriage 65 to roll up and down along the vertical extension 46. Further, the positioning of the rollers 80 prevents the carriage 65 from becoming disengaged from the vertical track 71. A variety of means may be utilized to attach a carriage to a vertical track in a manner allowing for secure, but adjustable vertical movement. Numerous arrangements may be utilized in cooperation with the present invention.

Referring to FIG. 3, vertical movement of the carriage 65 along the vertical track 56 is controlled by motor 85. A chain 86, FIG. 2, permits translation of motion between the motor 85 and the carriage 65. As the chain 86 is pulled upwardly by the motor 85, the carriage 65 is raised; and, conversely, as the chain 86 is lowered by the motor 85, the carriage 65 lowers. Suitable brake means, not shown, associated with the motor 85 permits control of the vertical position, i.e. height above the aisle 3, of the carriage 65, and thus the tray extractor 31.

The primary advantages of the present invention result from the development of a particular tray extractor 31 for utilization when shallow trays or thin sheets 10 are to be handled by the apparatus 1. The tray extractor 31, FIG. 10, includes two primary components: a tray engagement mechanism 90, which is manipulated by the apparatus 1 to grip or release the sheets 10; and a linear movement actuator 91, which is operated by the apparatus 1 to position the tray engagement mechanism 90 for engagement with sheets 10 and to move engaged sheets 10 into and out of storage locations 8, FIGS. 4, 6, 7 and 9. Thus, the linear movement actuator 91 is analogous to an arm whereas the tray engagement mechanism 90 is analogous to a hand.

Referring to FIGS. 6 and 10, the arm or linear movement actuator 91 comprises a linear motion link and pulley arrangement including a first link 100 and a second link 101. The tray engagement mechanism 90 is mounted upon an end 105 of the second link 101. The first link 100 and second link 101 cooperate such that movement of the first link 100 causes movement of the end 105 of the second link 101 and thus movement of the tray engagement mechanism 90 along a selected linear path. A detailed discussion of the linear movement actuator 91 follows. The linear motion of the tray engagement mechanism 90 will be understood by reference to FIGS. 6, 7 and 8 which illustrate that the tray engagement mechanism 90 may be moved from one side of the apparatus 1 to the other, or it may be positioned in the middle.

Referring to FIG. 10, the tray engagement mechanism 90 is mounted upon the carriage 65 by bracket 110. The bracket 110 is shown mounted upon the carriage front 75 by welding or the like. The bracket 110 has an upper extension 111 mounted thereon which extends generally outwardly from the carriage front 75. Together, the bracket 110 and upper extension 111 form a generally C-shaped bracket arrangememt 112 which has elongate upper and lower extensions 113 and 114 respectively. A vertical post 118 is mounted upon and extends between the upper and lower extensions 113 and 114. The vertical post 118 is held in place by nut 119.

The first link 100 has a first end 122 and a second end 123. A vertical cylindrical member 125 having a vertical channel 126 passing therethrough is mounted on the first end 122. The first link 100 is pivotally mounted on the post 118, with the post extending through the vertical channel 126. Referring to FIG. 6, the first end 122 of the first link 100 includes a pivoting extension 128 mounted thereon, as by welding. As the pivoting extension 128 is moved, the first link 100 pivots about the vertical post 118. This pivoting is seen by comparison of FIGS. 6, 7 and 8. Generally, this movement of the pivoting extension 128 is controlled by a link 130 communicating between the pivoting extension 128 and a pivoting rotor 131, FIG. 6. A variety of arrangements may be utilized to move the pivoting extension 128 and cause the rotational and swinging motion of the first link 100 about the post 118. The link 130 and rotor 131 shown are actuated by a motor 132 to selectively pivot the link 100 as desired. The rotor 131 and motor 132 are mounted upon the carriage 65 for vertical movement therewith.

Referring to FIGS. 6 and 10, the vertical cylindrical member 125 has a lower pulley 136 mounted thereon. The lower pulley 136 communicates with a detector 138 by means of a belt 139. By this latter arrangement, the rotational position of the first link 100 can be detected by detector 138 at any given time. As the first link 100 is rotated, the vertical cylindrical member 125 rotates, rotating the lower pulley 136, driving the belt 139, and thus rotating the detector 138. A variety of detectors may be utilized, and once a zero point or reference point has been determined, the angular position of the first link 100 can be constantly determined. Means for accomplishing this are generally well known.

Referring again to FIG. 10, a vertical sleeve 140 is mounted upon the second end 123 of the first link 100. The sleeve 140 has a central bore 141 extending therethrough. An axle 142 is rotatably received within the bore 141. The axle 142 has a first end 143 and a second end 144. An upper pulley 145 is non-rotatably mounted upon the axle first end 143. A second sleeve 146 is non-rotatably mounted upon the axle second end 144. By this arrangement, sleeve 140 rotates about the axle 142, whereas the upper pulley 145 and lower sleeve 146 do not. The axle 142 is mounted by nut 147.

An upper pulley 153 is non-rotatably mounted upon the vertical post 118. The upper pulley 153 of the vertical post 118 communicates with the pulley 145 on the upper end 143 of the axle 142 by means of belt 154, FIG. 10. When the first link 100 is pivoted, pulley 153 remains stationary. When the second end 123 of the first link 100 is swung through its pivoting arc, the stationary pulley 153 will transmit motion to the pulley 145 mounted upon the axle 142, causing the axle 142 to rotate. The extent of rotation of the vertical axle 142 is predictable, and can be controlled by a gear ratio selection dependent primarily upon the relative sizes of pulleys 145 and 153.

The second link 101 includes a first end 105 upon which the tray engagement mechanism 90 is mounted, and a second end 160 which is mounted upon sleeve 146 as by welding. Thus, as axle 142 is rotated, link 101 will be swung through an arc since sleeve 146 will rotate. The extent of the arc of movement of the second link 101 is controlled, remotely, by pivoting the first link 100, and translation of motion through the two pulleys 145 and 153 described above.

The first end 105 of the second link 101 includes a third sleeve 165 mounted thereon, FIG. 11. The third sleeve 165 has a central vertical bore 166 extending completely therethrough. When the linear movement actuator is positioned so that the second link 101 is directly beneath the first link 100, as in FIG. 8, the third sleeve 165 is positioned with its longitudinal axis generally colinear with a longitudinal axis of the first vertical cylindrical member 125. This arrangement permits a controlled translation of movement from the first link 100 to the third sleeve 165. As the first link 100 is pivoted, the non-rotating pulley 153, by means of belt 154, generates rotation of the vertical axle 142 by causing rotation of pulley 145. As the axle 142 rotates, so does sleeve 146, upon which the second link 101 is mounted. This transmits linear motion to the third sleeve 165, moving a central axis of the third sleeve 165 along a line generally perpendicular to the aisle 3, or along line 170, FIG. 8. The gear ratio of pulleys 150 and 145 will be related to the manner of transference of this linear motion, and the factors which can be varied to accomplish the desired motion are generally well known. This mechanical arrangement is generally referred to herein as a linear movement actuator 91 comprising a linear-motion link and pulley arrangement having first and second links.

As indicated above, the tray engagement mechanism 90 is mounted upon the end 105 of the second link 101, FIG. 11. The tray engagement mechanism 90 comprises means by which trays or sheets 10 are gripped by the apparatus 1. A variety of tray engagement mechanisms 90 may be utilized and before description of a preferred mechanism is made, a detailed discussion of the means permitting controlled orientation of the tray engagement mechanism 90, with respect to the position of the second link 101, is presented.

The side edges 11 of the sheets 10 are generally oriented, when in storage locations 8, perpendicular to the longitudinal axis of the aisle 3. Therefore, for best engagement between a tray engagement mechanism 90 and the rectangular sheets 10, the tray engagement mechanism must be pivotally mounted on the end 105 of the second link 101, so that as the second link 101 is pivoted by the first link 100, the rotational orientation of the tray engagement mechanism 90 remains unchanged. This latter will also be necessary if the tray or sheet 10 is to be pulled out of the storage location 8 along a linear path generally parallel to the side edges 11 of the sheets 10.

The orientation of the tray engagement mechanism 90 is controlled by an orientation adjustment mechanism 175, FIGS. 10 and 11. The tray engagement mechanism 90 is mounted upon, and suspends from, a bearing 176, which generally rests upon an upper end 177 of the third sleeve 165. The tray engagement mechanism 90 is mounted on the bearing 176 such that as the bearing 176 is rotated, the tray engagement mechanism 90 simultaneously, concomitantly, and coaxially rotates. More detail of the engagement between the tray engagement mechanism 90 and the bearing 176 are provided below, where the tray engagement mechanism 90 is discussed in detail.

The bearing 176 has a pulley 180 nonrotatably mounted thereon. An orientation adjustment pulley 181 is mounted upon the second sleeve 140 substantially near a lower end 182 thereof. The orientation adjustment pulley 181 communicates with pulley 180 on the bearing 176 by means of belt 185. As the second sleeve 140 is moved through a pivoting arc by the first link 100, rotational motion will be transferred to the bearing 176 by the nonrotating pulley 181 acting upon the bearing pulley 180 through belt 185. The rotational motion transferred to the bearing 176 maintains the tray engagement mechanism 90 in a selected position with respect to the path of linear movement 170, FIG. 8, as the linear-motion link and pulley arrangement is operated.

The general structure described above for the interaction of the links 100 and 101 as well as pulleys 145, 153, 180 and 181 comprises a linear movement actuator 91 and an orientation adjustment mechanism 175 which can be used to move a selected tray engagement mechanism 90, and, if necessary, an engaged tray or sheet 10, through a linear path 170 which, in this embodiment, extends generally perpendicular to the aisle 3, and parallel to the side edges 11 of any tray or sheet 10 to be engaged by the apparatus 1.

Figure 12:
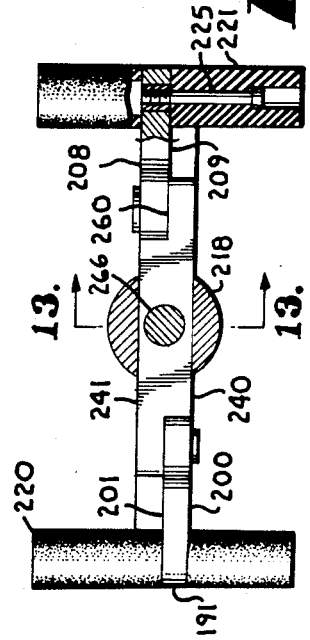
FIG. 12 is an enlarged, top cross-sectional view of a portion of the apparatus, taken generally along line 12—12, FIG. 10.

As indicated above, tray engagement mechanism 90 comprises a gripper or hand by which the apparatus 1 engages a sheet 10. The preferred tray engagement mechanism 90 comprises a generally X-shaped scissors mechanism 190, FIG. 11 having a first cross member 191 and a second cross member 192. The first cross member 191 has a first end 195, a second end 196 and a central portion 197. Referring to FIG. 12, the first cross member 191 has a first side 200 and a second side 201.

The second cross member 192 is generally identical to the first cross member 191 and has a first end 205, a second end 206, a central portion 207, a first side 208 and a second side 209, FIGS. 11, 12 and 14.

The first cross member 191 has a central aperture 215 extending completely therethrough, FIG. 14. Similarly, the second cross member 192 has a central aperture 216 extending therethrough. The apertures 215 and 216 are generally centrally located in the cross members 191 and 192 respectively. The cross members 191 and 192 are mounted adjacent one another upon a pin 217, FIG. 10. The pin 217 is mounted upon a yoke 218 which is mounted upon and suspends from the bearing 176. By this arrangement, the cross members 191 and 192 are rotatably mounted upon the pin 217 to form the X-shaped scissors mechanism 190, with the first end 195 of the first cross member 191 positioned generally vertically over the second end 206 of the second cross member 192, and with the first end 205 of the second cross member 192 positioned generally vertically over the second end 196 of the first cross member 191.

As the cross members 191 and 192 are pivoted upon the pin 217 a scissors-type movement is generated. Referring to FIG. 12, the cross members 191 and 192 are mounted such that the second side 201 of the first cross member 191 is facing the second side 209 of the second cross member 192.

Referring to FIG. 14, each cross member, 191 and 192, has four extensions 220 thereon. Each extension 220 is a generally cylindrical piece of rubber 221 having a central bore 222 therethrough. The rubber cylinders 221 are mounted upon the cross members 190 and 191 by posts 225. The cylindrical rubber portions 221 snugly fit over each of the posts 225. By reference to FIG. 12, it is understood that the extensions 220 have different lengths, to accommodate matching up with an associated rubber cylinder, in forming jaws. This is to accommodate the width of the cross-members 191 and 192.

Figure 13:
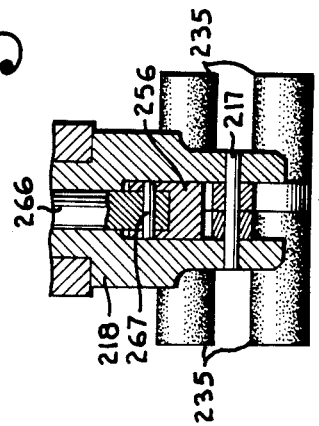
FIG. 13 is an enlarged, fragmentary, cross-sectional view of a portion of the apparatus taken generally along line 13—13 of FIG. 12.

The eight rubber cylinders 221 form four pairs of opposed jaw members 235, FIGS. 10 and 13. Referring to FIG. 12, two of the jaw member pairs 235 extend outwardly from one side 240 of the X-shaped scissors mechanism 190 and two pairs of jaw members 235 extend outwardly from a second side 241 of the X-shaped scissors mechanism 190. As the cross members 191 and 192 are selectively pivoted about the pin 217, the pairs of jaw members 235 are selectively actuated to grip or release an object placed between them. It will be understood that an object can be approached from either the first side 240 or the second side 241 of the X-shaped scissors mechanism 190, and it may still be engaged.

The method by which the jaw members 235 engage a thin sheet or tray 10 is illustrated in FIG. 4. Both pairs of jaw members 235 located on a selected side of the X-shaped scissors mechanism 190 simultaneously engage a tray 10, when the tray engagement mechanism 90 is actuated. Thus, at any given time, the tray or sheet 10 will be gripped by the tray engagement mechanism 90 at two separate locations and will be firmly held in resistance to any rotational movement tending to tip the sheet 10 out of a horizontal position. If the outside diameter of the rubber cylinders 221 is appropriately selected, a portion of some of the jaw members 235 will tend to engage a trough or rise in a corrugated tray 10, aiding in secure gripping of this tray or sheet 10.

It is generally desirable for both pairs of jaw members 235, located on whichever side of the X-shaped scissors mechanism 190 is approaching a tray 10 for engagement, to be simultaneously actuated to engage or release a tray 10, so that the tray of sheet 10 is not tipped during operation of the apparatus 1. This is generally accomplished with a scissors mechanism actuator 250 described below.

Referring to FIG. 14, each cross member, 191 and 192 respectively, has a actuator loop 251 mounted thereon. In the embodiment shown, the actuator loops 251 are mounted upon the cross members 191, 192 substantially near the first ends 195 and 205 thereof. Each actuator loop 251 defines an identical, elongate slide aperture 253.

An elongate slide 256 communicates between the actuator loops 251 of the two cross members, 191 and 192. The slide 256 is mounted upon each cross member 191 and 192 by a pin 257 which extends through the slide aperture 253 into an associated pin receiving aperture 258. When vertical pressure is placed upon the slide 256, FIG. 14, it will be pushed downwardly, generally causing scissors-like action of the two cross members 191 and 192 as they pivot about the central pin 217. The elongate slide apertures 253 accommodate rotational movement of the cross members 191 and 192 as the slide 256 moves.

Referring to FIG. 14, the slide 256 includes two cut-out portions 260 therein, at which the cross members 191 and 192 are mounted. Referring to FIG. 12, it will be understood that these cut-out portions 260 permit the cross members 191 and 192 to be mounted substantially adjacent one another in the apparatus 1. In the absence of the cut-out portions 260, the cross members 191 and 192 would be spaced apart approximately the width of the slide 256.

The vertical movement of the slide 256 which selectively actuates the X-shaped scissors mechanism 190 may be controlled by a variety of mechanisms. Generally, a piston arrangement, briefly described below, is preferred.

Referring to FIG. 10, a piston drive, such as a solenoid 265 is mounted upon the bearing 176. The solenoid 265 controls vertical movement of a piston 266 which is attached to the slide 256 by a pin 267, FIG. 13. As the solenoid 265 is actuated by conventional means (not shown) the piston moves up and down as selected, pushing or pulling the slide 256 and selectively actuating the X-shaped scissors mechanism 190.

From the above description, and the drawings, it will be understood that the orientation adjustment mechanism 175 rotates not only the X-shaped scissors mechanism 190, as needed to maintain the tray engagement mechanism 90 in preferred orientation for engagement with trays or sheets 10, but it also orients the slide 256 and the piston 266 as necessary to accommodate rotational movement of the tray engagement mechanism 90 relative to the third sleeve 165. This is generally accommodated by completely mounting the tray engagement mechanism 90 upon the bearing 176, and having it extend generally downwardly therefrom.

Referring to FIG. 5, the apparatus 1 includes a tray support mechanism 270 upon which a tray 10 rests, when it is being carried by the apparatus 1. The tray support mechanism 270 comprises a pair of parallel pallet rails 271 supported upon a framework 272. The rails 271 are generally positioned apart an appropriate amount for support of any given tray 10. Stripping 273, made of rubber or the like, mounted upon the rails 271 helps ensure secure engagement between any given tray 10 and the support mechanism 270.

The framework 272 is mounted upon the carriage 65 by a parallelogram linkage system 275, FIG. 10. As the carriage 65 moves up and down on the apparatus 1, the entire support mechanism 270 is maintained in fixed position relative to the tray engagement mechanism 90 and the linear movement actuator 91. The parallelogram linkage system 275, selectively actuated by piston and cylinder arrangement 280 comprises a lift mechanism or means permiting the rails 271 to be raised and lowered relative to the X-shaped scissors mechanism 190, as selected. This movement of the support mechanism 270 will be readily understood from the below description of the operation of the apparatus 1.

Generally operation of the apparatus 1 is as follows:

Referring to FIG. 1, first the transport assembly 30 is operated to position the tray extractor 31 at the stack 35 from which a tray 10 is to be extracted. The operation described is for extraction of a sheet from a storage location and transportation of that sheet to a second location; however, numerous other applications of the apparatus 1 are possible.

Referring to FIG. 2, a second step in the operation referred to above is to position the carriage 65, vertically, with respect to the stack 35 of tray or sheets 10, such that the X-shaped scissors mechanism 190 is positioned at the appropriate vertical height to engage a selected sheet 10 in a storage bin 8. From the previous description, it will be understood that the X-shaped scissors mechanism 190 can be positioned to engage a sheet 10 in a storage location 8 on either side of the aisle 3.

The piston 280 is then be operated to actuate the parallelogram linkage system 275 and to raise the frame member 272, along with the rails 271 of the support mechanism 270. Generally, the parallelogram linkage system 275 operates such that when the support mechanism 270 is raised, the rails 271 will extend to the same height as the sheet 10, that is, to the engagement level of the X-shaped scissors mechanism 190. The raised orientation is shown in FIG. 4. Phantom lines in FIG. 4 show the lower orientation.

The linear movement actuator 91 is then actuated to move the X-shaped scissors mechanism 190 against the front edge 12 of a sheet 10 to be engaged, FIG. 6. The X-shaped scissors mechanism 190 is then actuated by the scissors mechanism actuator 250 to grip the sheet 10 by means of the appropriate pairs of jaw members 235. Selective actuation of the linear movement actuator 91 pulls the sheet 10 out from the storage location 8, FIG. 6. Linear movement of the sheet 10 is ensured by the orientation adjustment mechanism 175. Thus, the only movement of the tray 10 is along a linear path 170 generally perpendicular to the aisle 3. In the above manner, the tray or sheet 10 is pulled off of the longitudinal side supports 26 onto rails 271 of the support mechanism 270, which are positioned at the same vertical height as the side supports 26, FIG. 4. A fragmentary view of the apparatus 1 in a stage of operation at which the sheet 10 has been completely removed from a storage location 8, is shown in FIG. 7.

Next, the scissors mechanism 190 is actuated to release the tray and the linear movement actuator 91 is utilized to move the scissors mechanism 190 completely out of engagement with the sheet 10. The parallelogram linkage arrangement 275 is then actuated to lower the support mechanism 270, and thus the sheet 10. With the support mechanism 270, FIGS. 5 and 8, now lowered, the linear movement actuator is operated to move the X-shaped scissors mechanism 190 to a central position over the sheet 10.

The apparatus 1 may be transported to a second location where off-loading of the transported sheet 10 is desired. Since the support mechanism 270 has lowered the tray 10 into a position below the X-shaped scissors mechanism 190, the linear movement actuator 91 can be utilized to position the scissors mechanism 190 beyond either end 12 or 13, of the sheet 10. Thus, the sheet 10 can be off-loaded from the apparatus 1 away from either side of the apparatus 1. Generally, off-loading involves an opposite sequence of steps to those outlined above.

The sequence of operation of the apparatus 1 may be varied somewhat from the above description. For example, the support mechanism 270, when no sheet 10 is resting thereon, may be in either its raised or lowered location during much of the operation of the apparatus 1.

A useful variation in the scissors mechanism 190 is shown in FIG. 15. Except for the variation in the opposing jaw members 335 described below, the embodiment of FIG. 15 is identical to that described above for the preferred embodiment, FIGS. 1 through 14. In the embodiment described in FIG. 15, the opposing jaw members 335 have teeth 336 mounted thereon. Generally, the teeth 336 are extensions on the cylinders 337. The teeth 336 are appropriately positioned to oppose, and engage, one another as the X-shaped scissors mechanism is operated. When the embodiment of FIG. 15 is utilized, the trays or sheets 10 will have slots or apertures therein which will be engaged by the teeth 336. In this manner, the teeth 336 will ensure a very secure engagement between the X-shaped scissors mechanism and the sheet, preventing the sheet from being pulled out of engagement with the opposing jaw members 335.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for selectively storing a thin tray in an elongate storage location, and retrieving said tray therefrom; said tray being generally rectangular in configuration and having substantially parallel front and rear edges, and having substantially parallel side edges; said apparatus comprising:
   (a) a tray extractor having a tray engagement mechanism, a tray linear-movement actuator, and an orientation adjustment mechanism;
      (i) said tray engagement mechanism being mounted on said linear-movement actuator and comprising a generally X-shaped scissors mechanism having two pairs of substantially simultaneously actuated opposing jaw members mounted thereon for selective engagement with a selected tray during actuation of said scissors mechanism; said scissors mechanism having a first side and a second side and being oriented for selective engagement of said tray engagement mechanism with a tray substantially adjacent either of said scissors mechanism first side or said scissors mechanism second side;
      (ii) said linear-movement actuator comprising a linear motion link and pulley arrangement including first and second links; said second link having a tray engagement mechanism mounting point thereon which exhibits linear movement, during operation of said linear-movement actuator, along a linear path of storage and retrieval centered on a line substantially parallel to and coplanar with said tray side edges and generally centered therebetween;
      (iii) said scissors mechanism being rotatably mounted on said mounting point, rotation of said scissors mechanism being selectively controlled by said orientation adjustment mechanism to maintain a tray, being acted upon by said extractor, in an orientation for storage and retrieval;
   (b) a tray support mechanism including a pair of support rails and lift means;
      (i) said rails being generally parallel to said linear path of storage and retrieval, and being spaced apart to support a tray substantially along the side edges thereof;
      (ii) said lift means selectively lifting said rails to support a tray, or lowering out of immediate proximity of a tray, as selected, during operation of said assembly; and
   (c) a transport assembly having said extractor and said tray support mechanism mounted thereon; said transport assembly including transport means for selectively positioning said extractor in an operational position with respect to a selected storage location;
   (d) whereby a selected tray may be stored within a selected storage location, or removed therefrom.

2. An apparatus according to claim 1 wherein:
   (a) said transport assembly includes a floor-aisle positioning mechanism and a vertical positioning mechanism;
      (i) said floor-aisle positioning mechanism providing positioning of said apparatus at a selected position of a warehouse floor having the storage location positioned thereat;
      (ii) said vertical positioning mechanism having said extractor and said tray support mechanism mounted thereon and including vertical transport means for positioning said extractor and tray support mechanism at a selected vertical position for alignment with a selected storage location.

3. A combination for storing a thin tray in an elongate storage location and retrieving said tray therefrom; wherein said combination comprises:
   (a) a tray; said tray being generally rectangular and having opposite and generally parallel side edges, and, opposite and generally parallel front and rear edges;
      (i) said tray having a generally corrugated cross section of alternating rows of ridges and furrows; said rows of ridges and furrows extending generally parallel to said tray side edges;

(b) an apparatus for storing and retrieving said tray; said apparatus comprising a tray extractor, a tray support mechanism, and a transport assembly;
  (i) said tray extractor having a tray engagement mechanism, a tray linear-movement actuator and an orientation adjustment mechanism; said tray engagement mechanism being mounted on said linear-movement actuator and comprising a generally X-shaped scissors mechanism having two pairs of substantially simultaneously actuated opposing jaw members mounted thereon for selective engagement with said tray, said scissors mechanism having a first side and a second side and being orientable for selective engagement of said tray mechanism with said tray substantially adjacent either of said scissors mechanism first side or said scissors mechanism second side; said linear-movement actuator comprising a linear-motion link and pulley arrangement including first and second links; said second link having a tray engagement mechanism mounting point thereon, which undergoes linear movement during operation of said combination, along a linear path of storage and retrieval centered on a line substantially parallel to, coplanar with, and equidistant from, said tray side edges; and, said scissors mechanism being rotatably mounted on said mounting point, rotation of said scissors mechanism being selectively controlled by said orientation adjustment mechanism to maintain said tray in an orientation for storage or retrieval;
  (ii) said tray support mechanism including a pair of support rails and, lift means; said rails being generally parallel to said linear path of storage and retrieval, and being spaced apart to support said tray substantially along a portion thereof adjacent to said side edges; and, said lift means selectively lifting said rails to support said tray, or have said rails lowered out of immediate proximity of said tray, as selected; and
(c) said transport assembly having said extractor and said tray support mechanism mounted thereon; said transport assembly including transport means for selectively positioning said extractor in an operation position with respect to a selected storage location;
(d) whereby said tray may be stored within a selected location, or removed therefrom.

4. The combination of claim 3 wherein:
(a) said opposing jaw members include opposing cylindrial jaw portions which are actuated by said scissors mechanism to grip or release said tray as desired;
  (i) said cylindrical jaw portions extending longitudinally outwardly from said scissors mechanism, each jaw portion having a longitudinal axis aligned generally parallel to said tray ridges and furrows when said extractor engages said tray;
  (ii) said opposing jaw members engaging said tray, with some of said jaw portions received in tray furrows, when said scissors mechanism is actuated to grip said tray;
(b) whereby said tray is firmly held by said extractor when said scissors mechanism is actuated for engaging said tray, and whereby elongate, cylindrical objects may be transported on said tray, while resting in said furrows, between said ridges, said ridges preventing said objects from rolling about on a surface of said tray.

5. An apparatus for selectively storing a thin tray in an elongate storage location, and retrieving said tray therefrom; said apparatus comprising:
(a) a tray extractor having a tray engagement mechanism and a tray linear-movement actuator;
  (i) said linear-movement actuator selectively actuating linear movement of said tray engagement mechanism to transport an engaged tray into, or out of, a selected elongate storage location;
(b) said tray engagement mechanism being mounted on said linear-movement actuator; said tray engagement mechanism including an X-shaped scissors mechanism, a first pair of simultaneously actuated opposing jaw members and a second pair of simultaneously actuated opposing jaw members;
  (i) said scissors mechanism having a first tray engaging side and a second tray engaging side;
  (ii) said first pair of opposing jaw members being mounted on said scissors mechanism first side; and, said second pair of opposing jaw members being mounted on said scissors mechanism second side; either of said first pair of opposing jaw members or said second pair of opposing jaw members being selectively operable by said scissors mechanism to engage a relatively thin tray; and
(c) a transport assembly having said extractor mounted thereon; said transport assembly including transport means for selectively positioning said extractor in an operational position with respect to a selected storage location;
(d) whereby a selected thin tray may be stored within a selected elongate storage location, or removed therefrom; and
(e) whereby the selected tray to be stored or removed may be engaged by said extractor from a direction corresponding to said scissors mechanism frist side or, alternatively, said scissors mechanism second side, as necessary, to achieve said storage or retrieval.

6. An apparatus according to claim 5 wherein:
(a) each of said first pair of opposing jaw members and said second pair of opposing jaw members include tooth members;
  (i) said tooth members on said first pair of opposing jaw members being oriented to engage a selected tray when said tray is engaged by said scissors mechanism first side; and
  (ii) said tooth members on said second pair of oppsoing jaw members being oriented to engage a selected tray when said tray is engaged by said scissors mechanism second side.

7. An apparatus according to claim 5 wherein:
(a) said tray engagement mechanism includes a third pair of simultaneously actuated opposing jaw members mounted on said scissors mechanism first side;
  (i) said third pair of jaw members being oriented for substantially concurrent actuation with said first pair of jaw members to grip or release a tray engaged along said scissors mechanism first side; and
(b) said tray engagement mechanism includes a fourth pair of simultaneously actuated opposing jaw members mounted on said scissors mechanism second side;

(i) said fourth pair of jaw members being oriented for substantially concurrent actuation with said second pair of jaw members to grip or release a tray engaged along said scissors mechanism second side;

(c) whereby a selected tray is gripped by said extractor at two different locations thereon, during selected actuation of said tray engagement mechanism.

8. An apparatus for selectively storing a thin tray in an elongated storage location, and retrieving said tray therefrom; said apparatus comprising:

(a) a tray extractor having a tray engagement mechanism and a tray linear-movement actuator;
  (i) said linear-movement actuator selectively actuating linear movement of said tray engagement mechanism to transport an engaged tray into, or out of, a selected elongate storage location;

(b) said tray engagement mechanism being mounted on said linear-movement actuator; said tray engagement mechanism including an X-shaped scissors mechanism, a first pair of simultaneously actuated opposing jaw members and a second pair of simultaneously actuated opposing jaw members;
  (i) said scissors mechanism having a first tray engaging side and a second tray engaging side; and
  (ii) said first pair of opposing jaw members being mounted on said scissors mechanism first side; and said second pair of opposing jaw members being mounted on said scissor mechanism second side; either of said first pair of opposing jaw members or said second pair of opposing jaw members being selectively operable by said scissors mechanism to engage a relatively thin tray;

(c) whereby a selected thin tray may be stored within a selected elongate storage location, or removed therefrom; and (d) whereby the selected tray to be stored or removed may be engaged by said extractor from a direction corresponding to said scissors mechanism first side or, alternatively, said scissors mechanism second side, as necessary, to achieve said storage or retrieval.

9. An apparatus for selectively storing a thin tray in an elongate storage location, and retrieving said tray therefrom; said apparatus comprising:

(a) a tray extractor having a tray engagement mechanism and a tray linear-movement actuator;
  (i) said tray linear-movement actuator selectively actuating linear movement of said tray engagement mechanism to transport an engaged tray into, or out of, a selected elongate storage location;

(b) said tray engagement mechanism being mounted on said linear-movement actuator; said tray engagement mechanism including jaw member actuating means having a first tray engaging side and a second tray engaging side; said tray engagement mechanism further including a first pair of simultaneously actuated opposing jaw members and a second pair of simultaneously actuated opposing jaw members;
  (i) said first pair of opposing jaw members being mounted on said jaw member actuating means first side; and, said second pair of opposing jaw members being mounted on said jaw member actuating means second side; either of said first pair of opposing jaw members or said second pair of opposing jaw members being selectively operable by said jaw member actuating means to engage a relatively thin tray; and
  (ii) said jaw member actuating means being selectively operable to actuate said first pair of jaw members and said second pair of jaw members, as necessary, to grip or release a selected thin tray;

(c) a transport assembly having said extractor mounted thereon; said transport assembly including transport means for selectively positioning said extractor in an operational position with respect to a selected storage location;

(d) whereby a selected thin tray may be stored within a selected elongate storage location, or removed therefrom; and (e) whereby the selected tray to be stored or removed may be engaged by said extractor from a direction corresponding to said jaw member actuating means first side or, alternatively, said jaw member actuating means second side, as necessary, to achieve said storage or retrieval.

10. An apparatus according to claim 9 wherein:
(a) said tray engagement mechanism includes a third pair of simultaneously actuated opposing jaw members mounted on said jaw member actuating means first side;
  (i) said third pair of jaw members being oriented for substantially concurrent actuation with said first pair of jaw members, to grip or release a tray engaged along said jaw member actuator first side; and
(b) said tray engagement mechanism includes a fourth pair of simultaneously actuated opposing jaw members mounted on said jaw member actuating means second side;
  (i) said fourth pair of jaw members being oriented for substantially concurrent actuation with said second pair of jaw members, to grip or release a tray engaged along said jaw member actuating means second side;
(c) whereby a selected tray is gripped by said extractor at two different locations thereon, during selected actuation of said tray engagement mechanism.

11. An apparatus according to claim 9 wherein:
(a) each of said first pair of opposing jaw members and said second pair of opposing jaw members include tooth members;
  (i) said tooth members on said first pair of opposing jaw members being oriented to engage a selected tray when said tray is engaged along said jaw member actuating means first side; and
  (ii) said tooth members on said second pair of opposing jaw members being oriented to engage a selected tray when said tray is engaged along said jaw member actuating means second side.

12. An apparatus for selectively storing a thin tray in an elongate storage location, and retrieving said tray therefrom; said apparatus comprising:
(a) a tray extractor having a tray engagement mechanism and a tray linear-movement actuator;
  (i) said tray linear-movement actuator selectively actuating linear movement of said tray engagement mechanism to transport an engaged tray into, or out of, a selected elongate storage location;

(b) said tray engagement mechanism being mounted on said linear-movement actuator; said tray engagement mechanism including jaw member actuating means having a first tray engaging side and a second tray engaging side; said tray engagement mechanism further including a first pair of simultaneously actuated opposing jaw members and a second pair of simultaneously actuated opposing jaw members;
  (i) said first pair of opposing jaw members being mounted on said jaw member actuating means first side; and, said second pair of opposing jaw members being mounted on said jaw member actuating means second side; either of said first pair of opposing jaw members or said second pair of opposing jaw members being selectively operable by said jaw member actuating means to engage a relatively thin tray; and
  (ii) said jaw member actuating means being selectively operable to actuate said first pair of jaw members and said second pair of jaw members, as necessary, to grip or release a selected thin tray;
(c) whereby a selected thin tray may be stored within a selected elongate storage location, or removed therefrom; and
(d) whereby the selected tray to be stored or removed may bd engaged by said extractor from a direction corresponding to said jaw member actuating means first side or, alternatively, said jaw member actuating means second side, as necessary, to achieve said storage or retrieval.

13. An apparatus for selectively storing a thin tray in an elongate storage location, and retrieving said tray therefrom; the tray being generally rectangular in configuration and having substantially parallel front and rear edges, and substantially parallel side edges; said apparatus comprising:
  (a) a tray extractor having a tray engagement mechanism, a tray linear-movement actuator, and an orientation adjustment mechanism;
    (i) said tray engagement mechanism being mounted on said linear-movement actuator and including jaw member actuating means having at least a first and a second pair of substantially simultaneously actuated opposing jaw members mounted thereon for selective engagement, of a selected pair of said first and second pairs of opposing jaw members, with a selected tray during actuation by said jaw member actuating means; said jaw member actuating means having a first side and a second side and being orientable for selective engagement of said tray engagement mechanism with a selected tray oriented substantially adjacent either of said jaw member actuating means first side or said jaw member actuating means second side;
    (ii) said linear-movement actuator comprising a linear motion link and pulley arrangement including first and second links; said second link having a tray engagement mechanism mounting point thereon which exhibits linear movement, during operation of said linear-movement actuator, along a linear path of storage and retrieval centered on a line substantially parallel to and coplanar with the tray side edges and generally centered therebetween;
    (iii) said jaw member actuator being rotatably mounted on said mounting point, rotation of said jaw member actuating means being selectively controlled by said orientation adjustment mechanism to maintain a tray, being acted upon by said extractor, in an orientation for storage and retrieval;
  (b) a tray support mechanism including a pair of support rails and lift means;
    (i) said rails being generally parallel to said linear path of storage and retrieval, and being spaced apart to support a tray substantially along the side edges thereof;
    (ii) said lift means being selectively operable to lift said rails to support a tray, or be lowered out of immediate proximity to a tray, as selected, during operation of said assembly; and
  (c) a transport assembly having said extractor and said tray support mechanism mounted thereon; said transport assembly including transport means for selectively positioning said extractor in an operational position with respect to a selected storage location;
  (d) whereby a selected tray may be stored within a selected storage location, or removed therefrom.

14. A combination for storing a thin tray in an elongate storage location and retrieving said tray therefrom; wherein said combination comprises:
  (a) a tray; said tray being generally rectangular and having opposite and generally parallel side edges, and, opposite and generally parallel front and rear edges;
    (i) said tray having a generally corrugated cross section of alternating rows of ridges and furrows; said rows of ridges and furrows extending generally parallel to said tray side edges;
  (b) an apparatus for storing and retrieving said tray; said apparatus comprising a tray extractor, a tray support mechanism, and a transport assembly;
    (i) said tray extractor having a tray engagement mechanism, a tray linear-movement actuator and an orientation adjustment mechanism; said tray engagement mechanism being mounted on said linear-movement actuator and including jaw member actuating means having at least two pairs of substantially simultaneously actuated opposing jaw members mounted thereon for selective engagement with said tray, said jaw member actuating means having a first side and a second side, having at least one pair of opposing jaw members mounted on each side, and being orientable for selective engagement of said tray mechanism with said tray substantially adjacent either said jaw member actuating means first side or said jaw member actuating means second side; said linear-movement actuator comprising a linear-motion link and pulley arrangement including first and second links; said second link having a tray engagement mechanism mounting point thereon, which undergoes linear movement during operation of said combination, along a linear path of storage and retrieval centered on a line substantially parallel to, coplanar with, and equidistant from, said tray side edges; and, said jaw member actuating means being rotatably mounted on said mounting point, rotation of said jaw member actuating means being selectively controlled by said orientation adjustment mechanism to maintain said tray in an orientation for storage or retrieval;
  (ii) said tray support mechanism including a pair of support rails and lift means; said rails being generally parallel to said linear path of storage and retrieval, and being spaced apart to support said tray substantially along a portion thereof adjacent to said side edges; and, said lift means selectively lifting said rails to support said tray, or have said rails lowered out of immediate proximity of said tray, as selected; and
(c) said transport assembly having said extractor and said tray support mechanism mounted thereon; said transport assembly including transport means for selectively positioning said extractor in an operation position with respect to a selected storage location;
(d) whereby said tray may be stored within a selected location, or removed therefrom.

15. The combination of claim 14 wherein:
(a) said jaw member actuating means includes at least four pairs of said opposing jaw members, said pairs of opposing jaw members including opposing cylindrical jaw portions which are actuated by said jaw member actuating means to grip or release said tray as desired;
  (i) said cylindrical jaw portions extending longitudinally outwardly from said jaw member actuating means, each jaw portion having a longitudinal axis aligned generally parallel to said tray ridges and furrows when said extractor engages said tray;
  (ii) at least two of said pairs of opposing jaw members engaging said tray, with at least two of said jaw portions being received in tray furrows, when said jaw member actuating means is actuated to grip said tray;
(b) whereby said tray is firmaly held by said extractor when said jaw member actuating means is actuated for engaging said tray, and whereby elongate, cylindrical objects may be transported on said tray, while resting in said furrows, between said ridges, said ridges preventing said objects from rolling about on a surface of said tray.

* * * * *